(12) United States Patent
Kim

(10) Patent No.: US 7,558,164 B2
(45) Date of Patent: Jul. 7, 2009

(54) OPTICAL PICK-UP ACTUATOR

(75) Inventor: Young Bok Kim, Soowon-si (KR)

(73) Assignee: LG Electronics Inc., Seoul (KR)

( * ) Notice: Subject to any disclaimer, the term of this patent is extended or adjusted under 35 U.S.C. 154(b) by 509 days.

(21) Appl. No.: 10/974,733

(22) Filed: Oct. 28, 2004

(65) Prior Publication Data

US 2005/0141358 A1    Jun. 30, 2005

(30) Foreign Application Priority Data

Dec. 29, 2003   (KR)   ............. 10-2003-0099180
Feb. 25, 2004   (KR)   ............. 10-2004-0012683

(51) Int. Cl.
*G11B 7/00*   (2006.01)

(52) U.S. Cl. ............. 369/44.15; 369/44.11; 369/44.22

(58) Field of Classification Search ............. None
See application file for complete search history.

(56) References Cited

U.S. PATENT DOCUMENTS

| | | | | |
|---|---|---|---|---|
| 3,924,076 A | * | 12/1975 | Dubois | ............. 369/146 |
| 4,373,983 A | * | 2/1983 | Walter | ............. 156/423 |
| 5,136,565 A | | 8/1992 | Ooyama et al. | |
| 5,625,511 A | * | 4/1997 | Brooks et al. | ............. 360/99.08 |
| 6,633,519 B2 | * | 10/2003 | Park et al. | ............. 369/44.14 |
| 7,014,798 B2 | * | 3/2006 | Ijima et al. | ............. 264/1.7 |
| 7,272,840 B2 | * | 9/2007 | Cheong et al. | ............. 720/683 |
| 2002/0003768 A1 | | 1/2002 | Park et al. | |
| 2003/0039199 A1 | | 2/2003 | Nogami | |
| 2003/0161228 A1 | | 8/2003 | Wada | |
| 2003/0193854 A1 | | 10/2003 | Lee et al. | |
| 2003/0234457 A1 | | 12/2003 | Ijima et al. | |
| 2006/0233069 A1 | * | 10/2006 | Mori et al. | ............. 369/44.15 |

FOREIGN PATENT DOCUMENTS

| | | |
|---|---|---|
| EP | 0 650 161 A1 | 4/1995 |
| EP | 1394784 A2 | 3/2004 |
| JP | 2001-184683 A | 7/2001 |
| JP | 2003173557 A | 6/2003 |
| KR | 2003-0050752 A | 6/2003 |

* cited by examiner

*Primary Examiner*—Wayne R Young
*Assistant Examiner*—Adam R Giesy
(74) *Attorney, Agent, or Firm*—Birch, Stewart, Kolasch & Birch, LLP

(57) ABSTRACT

An optical pickup actuator includes a lens holder for holding an object lens and having a receiving area, coils in the receiving area of the lens holder, at least one magnet opposing the coils, a yoke plate having a first yoke for supporting the magnet, and a yoke structure having second yokes inserted into the yoke plate.

21 Claims, 17 Drawing Sheets

OPTICAL PICK-UP ACTUATOR

This application claims the benefit of Patent Application No. 2003-099180 filed on Dec. 29, 2003 in Republic of Korea and Patent Application No. 2004-012683 filed on Feb. 25, 2004 in Republic of Korea. The entire contents of each of these applications are hereby fully incorporated by reference.

BACKGROUND OF THE INVENTION

1. Field of the Invention

The present invention relates to an optical pick-up actuator, and more particularly, to an optical pick-up actuator that can minimize vibration generated by a yoke plate.

2. Description of the Related Art

Generally, in a device for reading and writing information using an optical disk, an optical pick-up actuator functions to allow a laser beam transmitted through an object lens to be accurately located on a track formed on a surface of the disk. With the storage capacity of the optical disk being increased, it is increasingly required to provide a more precision driving control of the optical pick-up actuator.

In order to provide a more precision driving control, the number of apertures of the object lens is increased. However, the increase in the number of apertures inevitably generates aberration due to the tilt of the disk. The tilt of the disk deteriorates the playback function and makes it difficult to form pits in the course of writing information.

Therefore, there is a need for a tilt motion device for correcting the tilt of the disk while performing the tracking operation. There are two typical methods of correcting the tilt: a method of correcting the tilt by moving the overall body of an actuator using a DC motor, and a method of correcting the tilt by moving only an optical pick-up motion part (a lens holder) of the actuator.

The former method has a problem that it corrects only a disk in a low frequency band and increases the overall size of the optical disk player.

In order to perform the latter method, two types of optical pick-up actuators, a moving coil type and a moving magnet type, have been proposed. The moving coil type has at least six wires connected to a driving side to control the tilt motion, thereby complicating the structure of the actuator. The moving magnet type has a disadvantage of making it difficult to obtain enough sensitivity required for the object lens of the lens holder.

FIGS. 1 through 4 show a motion type optical pick-up actuator according to a related art. Referring to FIGS. 1 through 4, the optical pick-up actuator of the related art includes an object lens 11 for focusing a laser beam to/from an optical disk, a tracking coil 12 and a focusing coil 13 both installed on a rear side of the object lens 11, a lens holder 10 provided at a rear surface with tilt magnets 15, and front and rear yokes 22 for fixing magnets 21 to realize tracking and focusing motions of the tracking and focusing coils 12 and 13.

The optical pick-up actuator further includes a yoke plate 20 spaced apart from the front and rear yokes 22 and provided with a tilt yoke 23, a plurality of wire suspensions 30 disposed on both sides of the lens holder 10 and electrically connected to the tracking and focusing coils 12 and 13, a frame 40 provided at a rear surface with a board 43 for electrically connecting the wire suspensions 30 to each other, and a tilt coil 50 disposed around a yoke insertion member 42 to generate electromagnetic force around the tilt magnets 15.

The frame 40 is provided with fixing parts 41, and the yoke insertion member 42 for receiving the tilt yoke 23 is disposed between the fixing parts 41. The wire suspensions 30 extend through the fixing parts 41 and are connected to each other by the board 43 attached on the rear surface of the frame 40.

The tilt magnets 15 having opposite polarities, are disposed opposing the tilt coil 50 and the lens holder 10. The lens holder 10 is provided at a rear surface with fitting grooves 16 for receiving the tilt magnets 15. The fitting grooves 16 are formed on the left and right sides based on a central line of the lens holder 10 on which the object lens 11 is installed. Instead of forming the fitting grooves 16, adhesive may be used to attach the tilt magnets 15 on the rear surface of the lens holder 10. Alternatively, the tilt magnets 15 may be further provided on a front surface of the lens holder 10. In this case, plural tilt magnets 15 correspond to a single coil 50 in a state where the tilt yoke 23 is formed on a yoke plate 20.

The operation of the above described optical pick-up actuator of FIG. 1 will be described hereinafter.

The focusing and tracking motions of the optical pick-up actuator are realized by electromagnetic force generated by the magnets 21 attached on the yokes 22 and the focusing and tracking coils 13 and 12 of the lens holder 10, thereby reading and writing data.

The tilt motion of the actuator for eliminating the tilt aberration caused by the high RPM of the optical disk is realized by electromagnetic force generated by the tilt magnets 15 installed on the lens holder 10 and the tilt coils 50 installed on the tilt yoke 23 to tilt the lens holder 10. That is, the tilt magnets 15 installed on the left and right sides of the lens holder 10 holding the object lens 11 are, as shown in FIG. 4, disposed to have an polarity opposite to each other, whereby the tilt motion is carried out using the electromagnetic force generated by the tilt coil 50 disposed facing the tilt magnets 15.

In FIG. 4, the reference characters B, i and F indicate respectively electromagnetic field, current, and Lorentz force. The Lorentz force F is generated by interaction of the electromagnetic field B and the current i. The arrows beside the characters in FIG. 4 indicate the directions of the electromagnetic field, the current, and the Lorentz force. That is, since the current i flows in a predetermined direction and the tilt magnets 15 have polarity opposite to each other, coupled force is applied to the lens holder 10 on which the object lens 11 is installed. Since the coupled force corresponds to a moment applied in the direction of an X-axis, the lens holder 10 tilts in a seesaw motion about the X-axis.

As the tilt magnets 15 and the tilt coil 50 are disposed spacing away from the focusing and tracking coils 13 and 12, such a tilt motion can be realized independent from the focusing and tracking motions.

By maintaining a predetermined gap dx between the tilt magnets 15 and the tilt coil 50, magnetic flux between the tilt magnets 15 and the coil 50 is not varied in the course of performing the tracking motion.

Therefore, when compared with a related art hybrid-type optical pick-up actuator, the related art 3-axis motion type optical pick-up actuator has an advantage of increasing an output constant in the direction of the tilting motion as the gap dx between the tilt magnets 15 and the tilt coil 50 is set to have a minimal distance when the tilt motion is realized, without affecting the tracking and focusing motions in a state where the electromagnetic force is generated by the tilt magnets 15 and the coil 50.

As described above, the above-described 3-axis motion type optical pick-up actuator performs the 3-axis motion (focusing, tracking, and tilting motions) by providing the plural tilt magnets 15 formed on the lens holder 10 and the tilt coil 50 independently installed in the yoke insertion member 42 between the fixing parts 41 of the frame 40.

However, the tilt magnets 15 separately installed on a rear surface of the lens holder 10 cause the size and weight of the lens holder to be increased, which deteriorates the productivity and sensitivity of the pickup actuator. Furthermore, additional insertion and supporting structures for a magnetic circuit performing a radial tilt must be provided. In addition, since the wire suspension is composed of a 4-wire spring and a 2-coil spring to perform the 3-axis motion, this complicates the structure of the pickup actuator and deteriorates the productivity of the pickup actuator. Since the axis of the radial tilt is located on a rear side of the lens, an offset in the direction of the Z-axis is incurred. Since the front and rear yokes and the tilt yoke are bent in an L-shape from the yoke plate to receive the magnets for performing the 3-axis motion, the vibration generated by the front and rear yokes and the tilt yoke are directly transmitted to the yoke plate, which deteriorates the pick-up property. Furthermore, since the yokes are integrally bent from the yoke plate at right angles, it is difficult to process a mold and to couple the frame to the yoke plate.

FIGS. 5A through 7B show another structure of a yoke plate and frame assembly of an optical pickup actuator according to a related art.

A yoke vibration characteristic of the related art yoke plate will be described hereinafter with reference to FIGS. 5A through 7B.

As shown in FIGS. 5A and 5B illustrating respectively the top and bottom views of a yoke plate 70, the yoke plate 70 includes a first inner yoke 71 and a plurality of second inner yokes 72 all integrally extending from a bottom 76 of the yoke plate 70. Magnets (not shown) are attached on the inner yokes 71 and 72. A frame fixing part 74 formed in a Π-shape is formed integrally on the bottom 76 of the yoke plate 70 to fix a frame 80 (FIGS. 6A and 6B). The magnets are formed on the opposing surfaces of the first and second inner yokes 71 and 72, facing a coil (not shown) to tilt a lens holder (not shown).

As shown in FIGS. 6A and 6B illustrating respectively the top and bottom views of the yoke plate 70 having the frame 80 therein, the frame 80 is formed of plastic material and inserted between left and right walls 75 of the yoke plate 70 and in the frame fixing part 74 through an insert forming process. Therefore, the frame fixing part 74 prevents the inserted frame 80 from moving. The frame fixing part 74 is formed at a portion of the yoke plate 70, which is integrally formed and bent from an end of the yoke plate 70 at a predetermined depth. The reference numerals 81 and 82 indicate a board assembling guide projection and a wire suspension passing hole, respectively.

As described above, since the frame 80 is formed on a rear portion of the yoke plate 70, it can tightly contact the left and right walls 75 and the bottom 76 of the yoke plate 70.

The second inner yokes 72 are formed by bending a portion of the bottom 76 of the yoke plate 70, such that a space 77 is formed on the yoke plate 70. Accordingly, since only a bottom portion of the second inner yokes 72 is secured to the bottom 76 of the yoke plate 70, the second yokes 72 are weak against vibration.

As the object lens 11 moves quickly during an operation of the optical pickup actuator, it creates vibration. This vibration, which is worsened by the weak disposition of the yokes 71 and 72 and by the integral formation of the yokes 71 and 72 of the yoke plate 70, is directly transmitted from the yokes 71 and 72 to the bottom and other parts of the yoke plate 70 and to the frame 80 (see arrows F1, F2 and F3 in FIGS. 7A and 7B). Further, since the frame 80 is tightly secured on the yoke plate 70 such that there is no gap between the frame 80 and the yoke plate 70, the vibration generated by the yoke plate 70 is fully transmitted to the frame 80. This interferes significantly with the effective and accurate operation of the actuator, thereby deteriorating the overall performance of the actuator greatly.

SUMMARY OF THE INVENTION

Accordingly, the present invention is directed to an optical pick-up actuator that substantially obviates one or more problems due to limitations and disadvantages of the related art.

An object of the present invention is to provide an optical pick-up actuator having a main yoke integrally formed with a yoke plate and second yokes separately formed and fixed on the yoke plate.

Another object of the present invention is to provide an optical pick-up actuator having a first yoke integrally formed with a yoke plate and second yokes fixed between the yoke plate and the first yoke by adhesive.

Still another object of the present invention is to provide an optical pick-up actuator having a yoke plate provided with a frame fixing projection and left and right guide grooves formed on a rear end of the yoke plate so that the frame can be integrally fixed on the yoke plate by the frame fixing projection and the guide grooves.

Still another object of the present invention is to provide an optical pick-up actuator having a frame fixing projection inserted in a frame guide groove, epoxy resin being filled in the frame guide groove to prevent a frame from being separated, and an inner yoke being fixed on the yoke plate by the epoxy resin to attenuate vibration generated from the yoke plate.

Still yet another object of the present invention is to provide an optical pick-up actuator having a frame and a yoke plate, a stepped portion being formed on a bottom of the frame or a top of the yoke plate to minimize a surface contact between the yoke plate and the frame, thereby minimizing vibration transmitted from the yoke plate to the frame.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 8A:
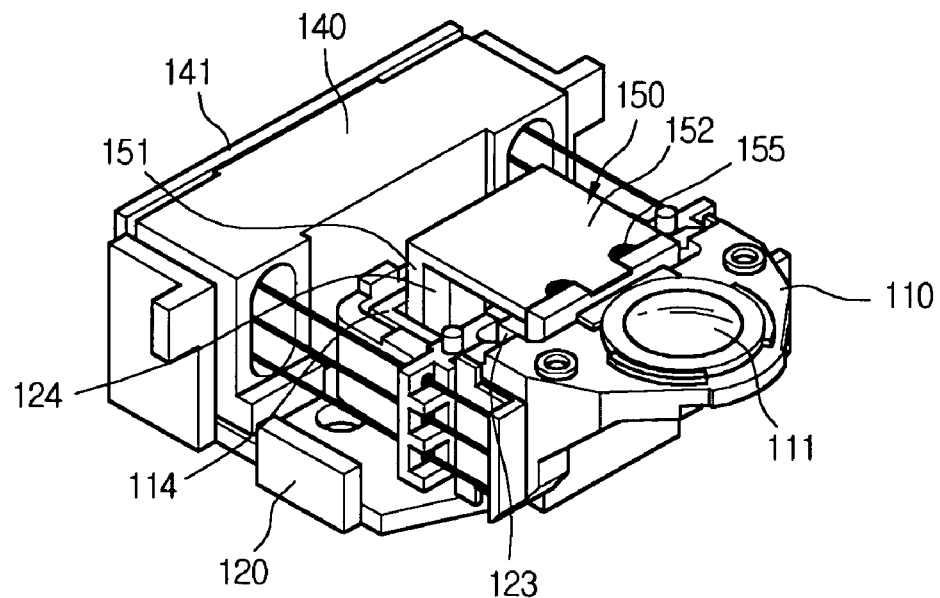
FIGS. 8A and 8B are respectively front and bottom perspective views of an assembled optical pick-up actuator according to an embodiment of the present invention.
Figure 8B:
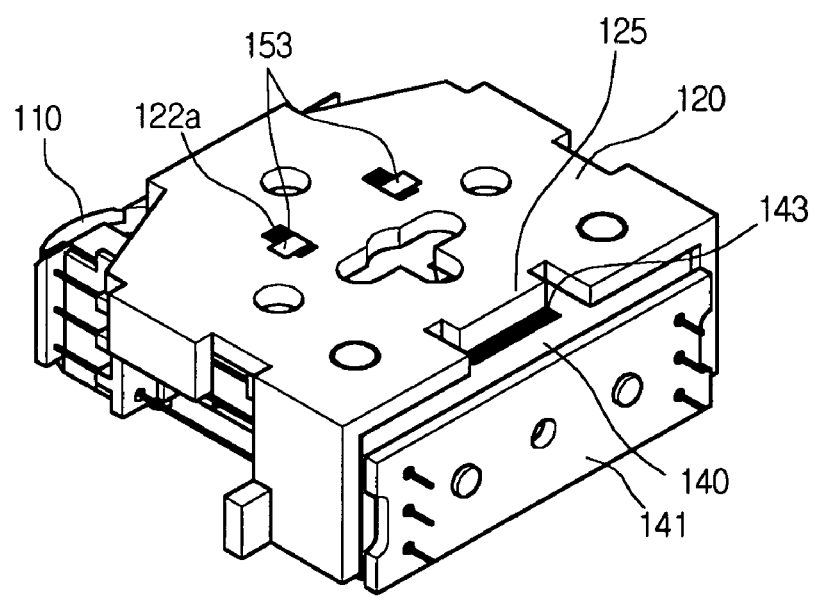
Figure 9A:
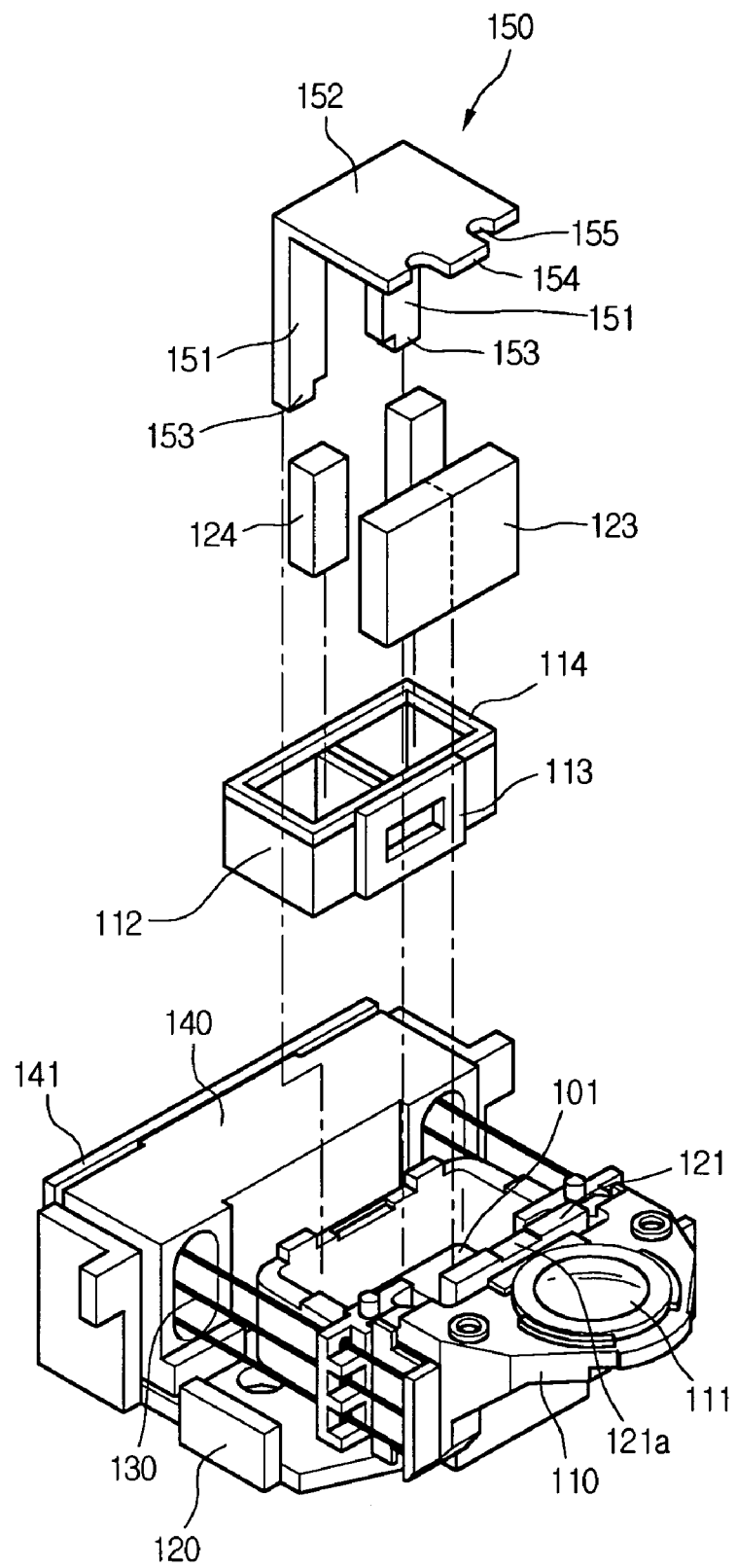
FIG. 9A is an exploded perspective view of the optical pick-up actuator of FIGS. 8A and 8B according to the present invention.
Figure 9B:
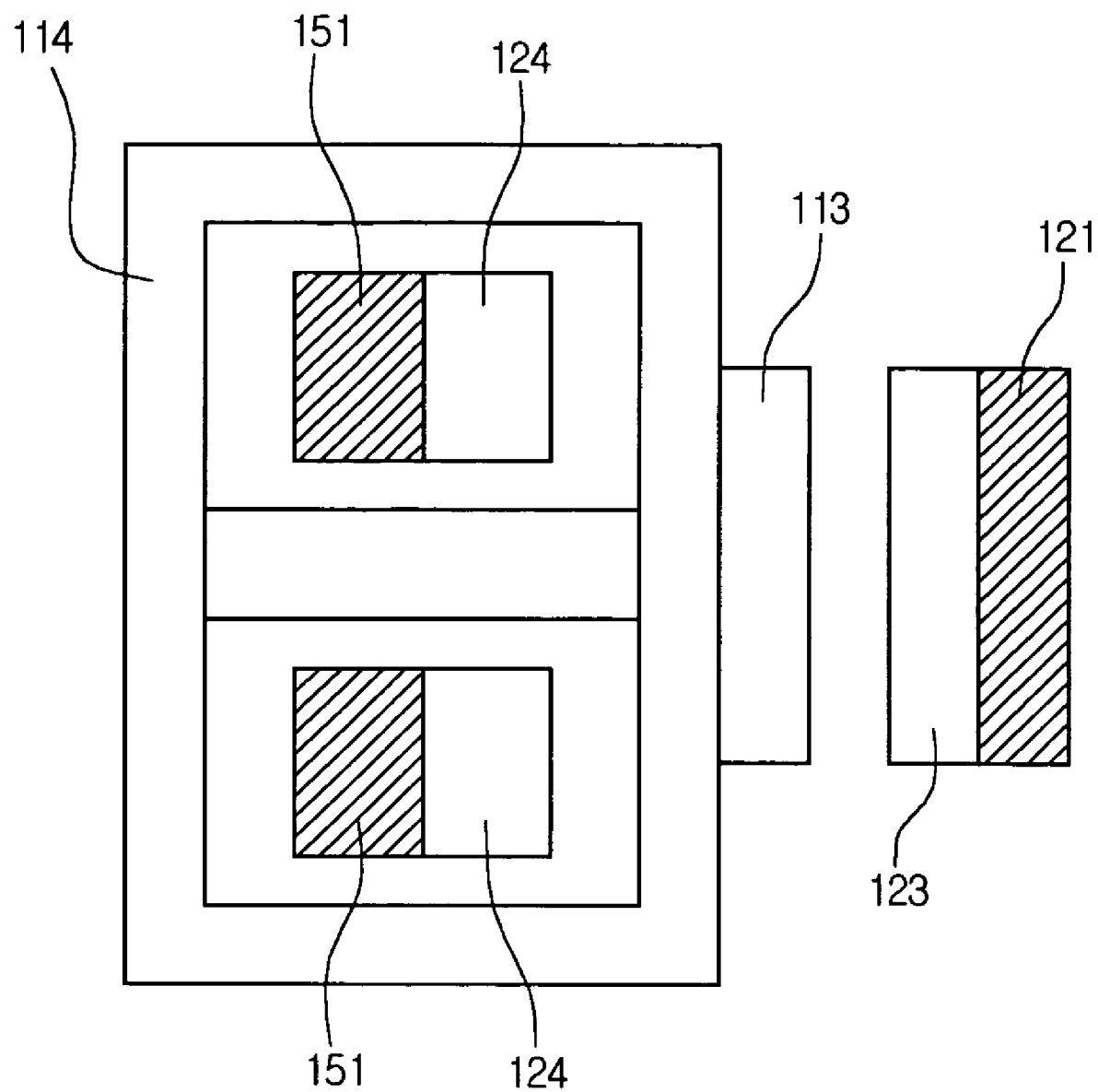
FIG. 9B is a top view of parts of the optical pickup actuator of FIG. 9A according to the present invention.
Figure 10:
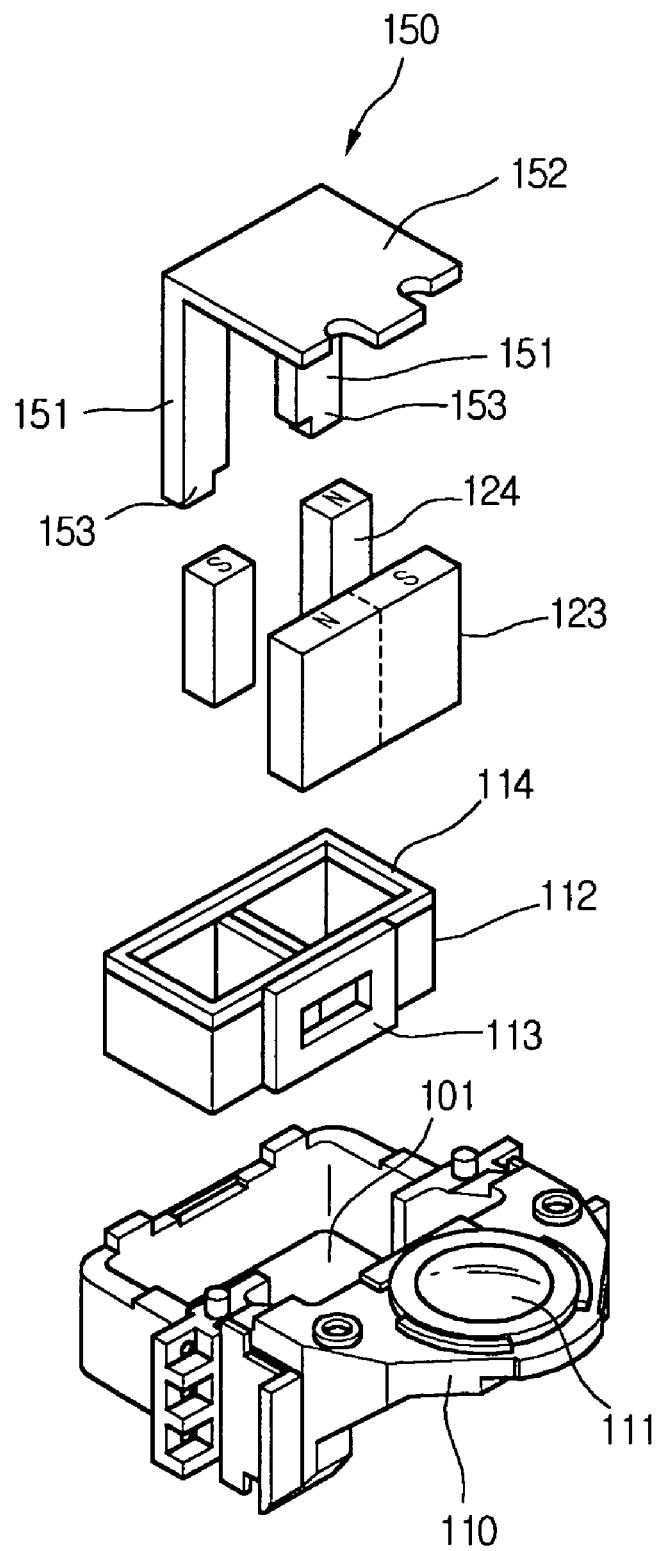
FIG. 10 is an exploded perspective view of a lens holder depicted in FIG. 9A according to the present invention.

FIGS. 8A and 8B show respectively front and bottom perspective views of an assembled optical pick-up actuator according to an embodiment of the present invention, FIG. 9A shows an exploded view of the optical pick-up actuator of FIG. 8A, FIG. 9B shows a top plan view of certain yokes and magnets of the optical pick-up actuator of FIG. 8A, and FIG. 10 shows an exploded view of a lens holder and elements placed therein in the optical pick-up actuator of FIG. 9A.

Referring to FIGS. 8A-10, the inventive optical pick-up actuator includes a lens holder 110 for holding an object lens 111. As shown in FIG. 10, the lens holder 110 holds therein a focusing coil 112, a tracking coil 113 disposed on a front surface of the focusing coil 112, and a tilt coil 114 disposed on a top of the focusing coil 112.

As shown in FIGS. 8A-9B, the optical pick-up actuator further includes a yoke plate 120 having a first yoke 121 located in a receiving groove 101 of the lens holder 110; a yoke structure 150 bent in a ⊓-shape to define inner yokes 151 and a top yoke 152; a bipolar magnet 123 and a plurality of unipolar magnets 124 that are respectively attached to the first yoke 121 and the inner yokes 151; a plurality of pairs of wire suspensions 130 (e.g., 3 pairs) supporting both sides of the lens holder 110 to feed current to the coils 112, 113 and 114; a frame 140 fixed on a rear portion of the yoke plate 120 to support the wire suspensions 130; and a main board 141 attached on a rear surface of the frame 140 to supply electric power to the coils 112, 113 and 114.

As shown in FIGS. 9A and 9B, the focusing coil 112 is composed of two wound coils that are wound horizontally and connected to each other in series, the two wound coils being inserted into the receiving groove 101 to correspond to the polarities of the bipolar magnet 123. The inner yokes 151 and the unipolar magnets 124 are inserted in the wound coils of the focusing coil 112. The tracking coil 113 is attached on the front surface of the focusing coil 112 having a center line corresponding to a polarity boundary of the bipolar magnet 123. The tilt coil 114 is disposed on a top of the focusing coil 112 opposing the bipolar magnet 123.

The bipolar magnet 123 may be formed of one magnet having multi poles on one face, or two unipolar magnets having one opposite poles on each face. The bipolar magnet 123 is disposed such that the polarities thereof are opposite to those of the unipolar magnets 124.

The object lens 111 is mounted on a portion of a top of the lens holder 110, and the coils 112, 113 and 114 are installed inside the lens holder 110.

The bipolar magnet 123 is attached to a surface of the first yoke 121 bent from a bottom plate of the yoke plate 120, and opposes the coils 112, 113 and 114. The unipolar magnets 124 are attached to the second yokes 151, opposing the bipolar magnet 123.

As mentioned above, the focusing coil 112 is inserted in the receiving groove 101 of the lens holder 110. The tracking coil 113 is attached to the front surface of the focusing coil 112, corresponding to the polarity boundary of the focusing coil 112. The tilt coil 114 is attached on the top of the focusing coil 112. The coils 112, 113 and 114 cooperate with the magnets 123 and 124 to define a magnetic circuit.

That is, the lens holder 110 is provided with the receiving groove 101 for receiving the magnetic circuit. The wound coils of the focusing coil 112 are disposed on the inner circumference of the receiving groove 101, corresponding to the left and right sides, which is divided on the basis of the polarity boundary of the bipolar magnet 123, such that a center of the lens holder 110 can correspond to a center of focusing force.

As the tilt coil 114 is installed on the top of the focusing coil 112, flux at a boundary between the wound coils of the focusing coil 112 may be minimized while sensitivity is maximized. The tracking coil 113 is vertically wound and has the centerline corresponding to the polarity boundary of the bipolar magnet 123. The tilt coil 114 is formed of a single body attached on the focusing coil 112 so that a radial tilt center thereof can be adjacent to the object lens 111 as close as possible, thereby improving the productivity of the actuator without limiting its focusing motion. In addition, when the lens 111 is driven in a radial tilt direction, an offset between the force center of the tilt coil 114 and a Z-axis optical center for tilting the object lens 111 can be minimized, thereby optimizing the optical property of the radial tilt.

Figure 11:
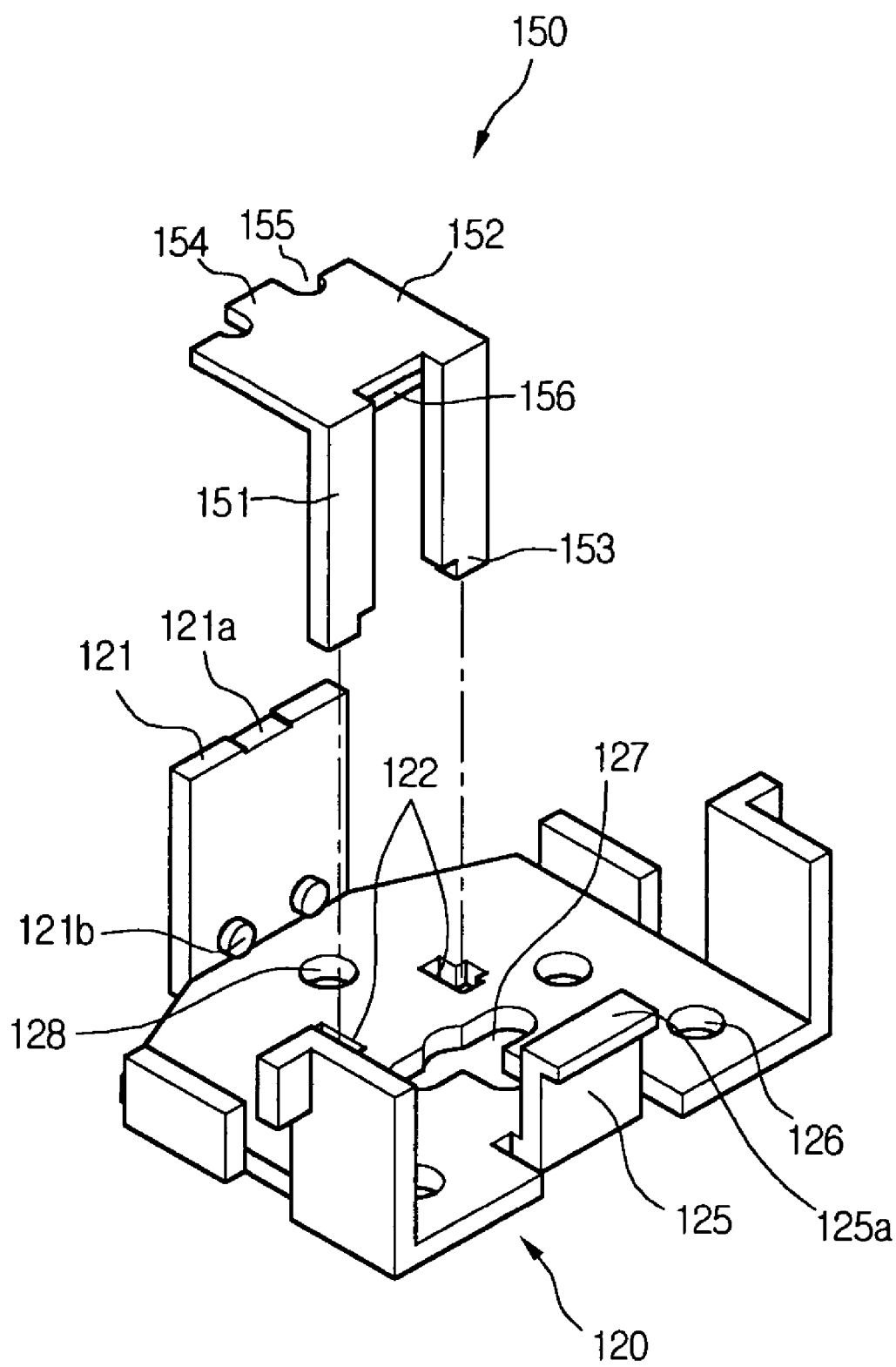
FIG. 11 is an exploded perspective view of a yoke plate and a yoke structure depicted in FIG. 9A according to the present invention.
Figure 12A:
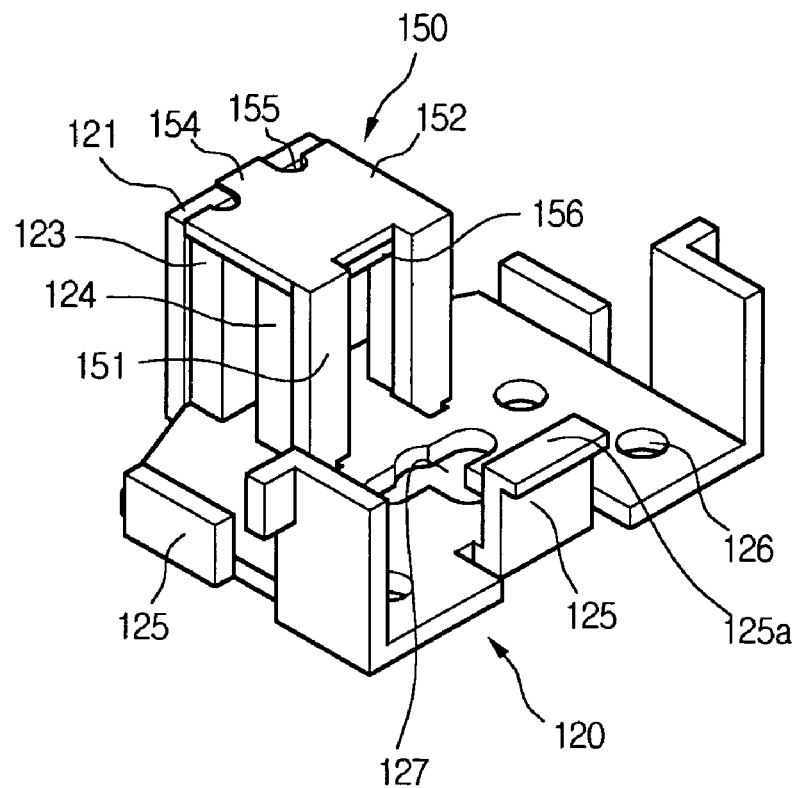
FIGS. 12A and 12B are respectively the front and bottom perspective views of the yoke plate assembled with the yoke structure of FIG. 11 according to the present invention.
Figure 12B:
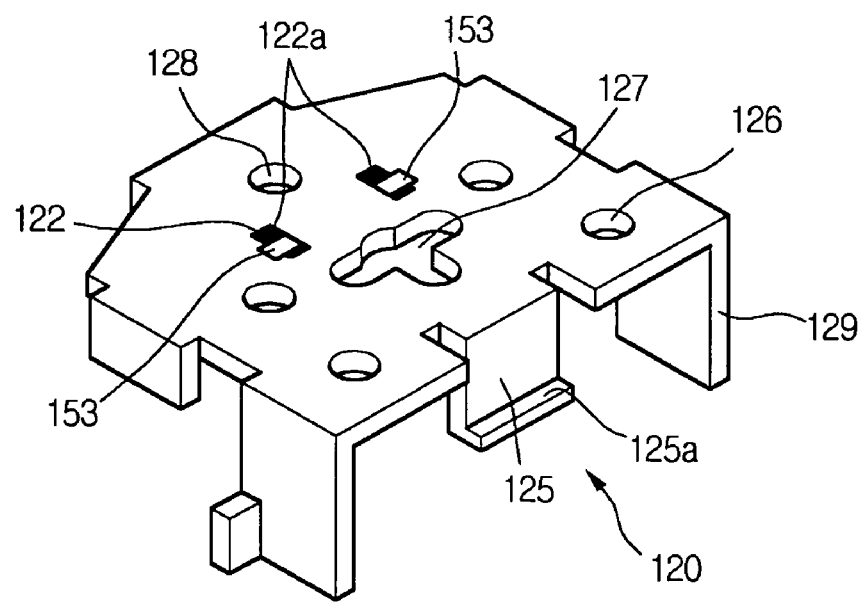

FIG. 11 shows an exploded view of the yoke plate 120 and the yoke structure 150 depicted in FIG. 9A and FIGS. 12A and 12B show an assembly of the yoke plate 120 and the yoke structure 150 of FIG. 11, thereby illustrating the mechanism for reducing yoke vibration according to the present invention.

Referring to FIGS. 11 through 12B, the yoke plate 120 is provided at its end with the first yoke 121. The yoke structure 150 is coupled to the yoke plate 120 as facing the first yoke 121. The second yoke structure 150 includes the inner yokes 151 and the top yoke 152 bent at (or about) right angles from the inner yokes 151. The top yoke 152 functions to form a closed magnetic circuit of the inner magnetic circuit. The yoke structure 150 is provided with yoke insertion projections 153 formed on the lower ends of the inner yokes 151.

The yoke plate 120 is provided with T-shaped guide grooves 122 wider than the yoke insertion projections 153.

The top yoke 152 of the yoke structure 150 is provided at its front end with a seating projection 154. The top yoke 152 is further provided at its both sides of the seating projection 154 with grooves 155 to enlarge a contact area with the first yoke 121. The first yoke 121 is provided at its top middle portion with a seating groove 121a on which the seating projection 154 is disposed. At this point, two holes are defined between the first yoke 121 and the yoke structure 150 by the grooves 155 formed on both sides of the seating projection 154.

The bipolar magnet 123 is attached to the first yoke 121 of the yoke plate 120, and the polar magnets 124 are attached to the inner yokes 151 of the yoke structure 150, facing the bipolar magnet 123 (FIG. 12A).

The first yoke 121 is provided at its lower portion with cylindrical stopper 121b for adjusting a height of the bipolar magnet 123 in directions of X-axis and Y-axis. A height adjusting plate 156 is attached on a bent portion of a bottom surface of the top yoke 152. The height adjusting plate 156 adjusts the bipolar magnet 123 to an identical height to those of the unipolar magnets 124.

Jig guide holes 127 and 128 are formed on the yoke plate 120. The jig guide holes 127 and 128 are formed on a centerline of the yoke plate 120 to guide a central axis of the lens holder 110. Since the yoke plate 120 is designed to fix the yoke structure 150 that is separately prepared, it is possible to obtain a space at a central portion of the yoke plate 120, thereby allowing the jig guide holes 127 and 128 to be formed on the central portion of the yoke plate 120.

Figure 13:
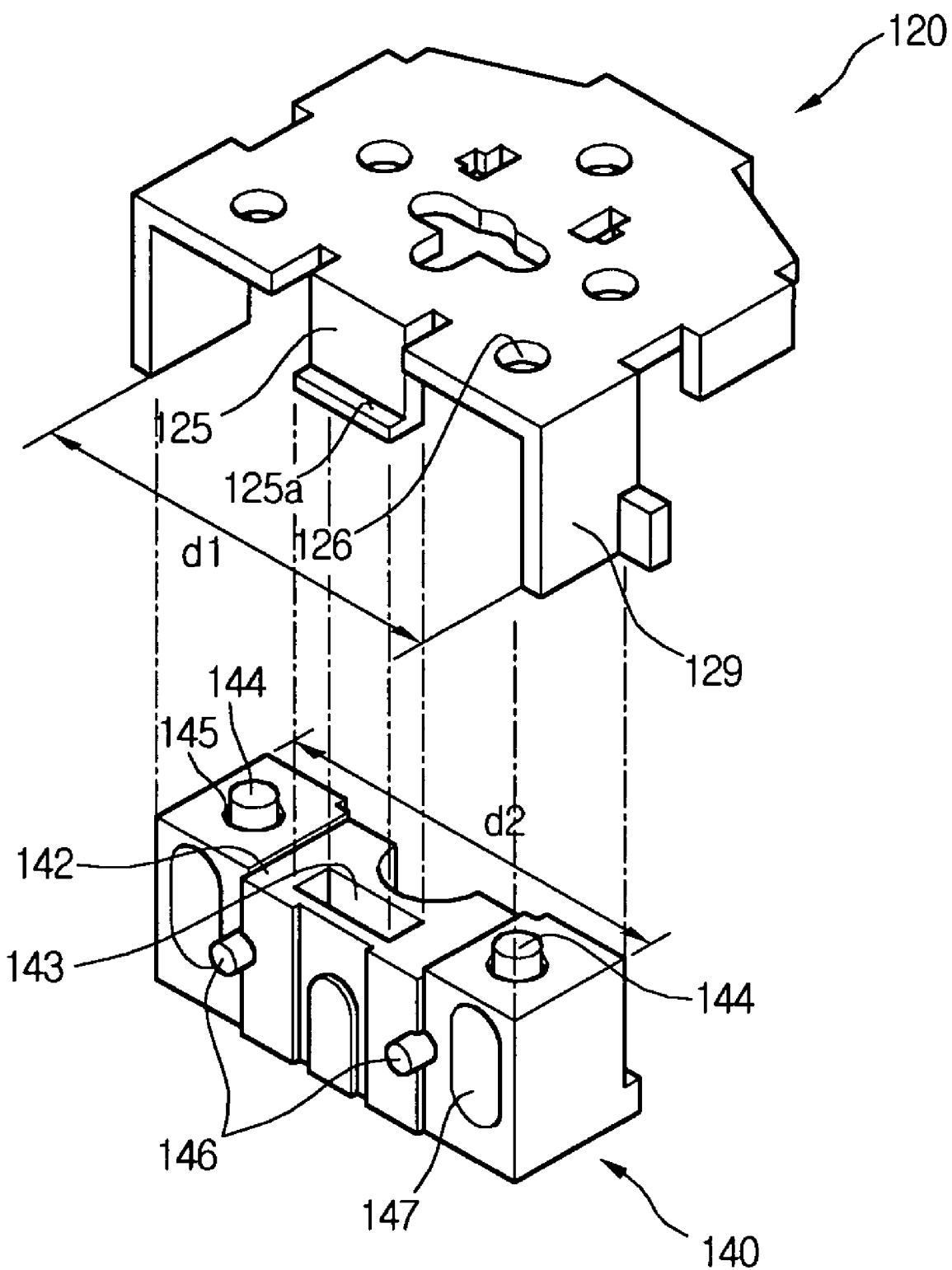
FIG. 13 is an exploded perspective view of the yoke plate and a frame depicted in FIG. 9A according to the present invention.

FIG. 13 shows an assembly of the yoke plate 120 and the frame 140 depicted in FIGS. 8B and 12B to illustrate a yoke vibration attenuating structure according to the present invention. It should be noted that FIG. 13 is a view of a back portion of the optical pick-up actuator of FIG. 9A that is flipped over.

Referring to FIG. 13, the yoke plate 120 is provided at its rear portion with a frame fixing projection 125 and left and right guide holes 126. The frame 140 is provided with a fixing guide groove 143 and guide projections 144 that mate respectively with the frame fixing projection 125 and the left and right guide holes 126.

The frame 140 is assembled on the rear end of the yoke plate 120 and the lens holder 110 is mounted on the front portion of the yoke plate 110, after which the bipolar magnet 123 is attached on the first yoke 121. At this point, the frame 140 is provided at its bottom middle portion with a stepped portion 142 such that, when the frame 140 is installed on the top of the yoke plate 120, a gap corresponding to a height of the stepped portion 142 can be defined between the bottom of the frame 140 and the top of the yoke plate 120.

The fixing projection 125 is inserted in the guide groove 143 and epoxy resin or some adhesive is filled in the guide groove 143 to prevent the frame 140 from being separated in the direction of Z-axis. The fixing projection 125 is provided at its lower end with a hook portion 125a bent at right angle to prevent the frame 140 from being separated in a downward direction by the epoxy resin filled and hardened in the guide groove 143.

The frame 140 is further provided at its bottom with the guide projections 144, which are inserted in the guide holes 126 formed on the yoke plate 120. At this point, the frame 140 is provided at the bottom around the guide projections 144 with undercuts 145 for preventing the generation of burr when the guide projections 144 are inserted in the guide holes 126.

The frame 140 is further provided at its rear surface with guide projections 146 for fixing the board and at left and right sides with suspension passing holes 147.

The dimensions of the yoke plate 120 and the frame 140 are configured so that a distance d1 between left and right walls 129 of the yoke plate 120 is greater than a distance d2 between left and right ends of the frame 140. When the frame 140 is coupled to the top of the yoke plate 120, as shown in FIGS. 9A and 13, since the distance d1 between left and right walls 129 of the yoke plate 120 is greater than the distance d2 between left and right ends of the frame 140, there are gaps between the left and right walls 129 of the yoke plate 140 and the left and right ends of the frame 140. In addition, by the stepped portion 143 on the frame 140, there is a gap between the top of the yoke plate 120 and the bottom of the frame 140. Such gaps reduce or prevent transmission and application of vibration on the parts of the actuator.

Figure 14A:
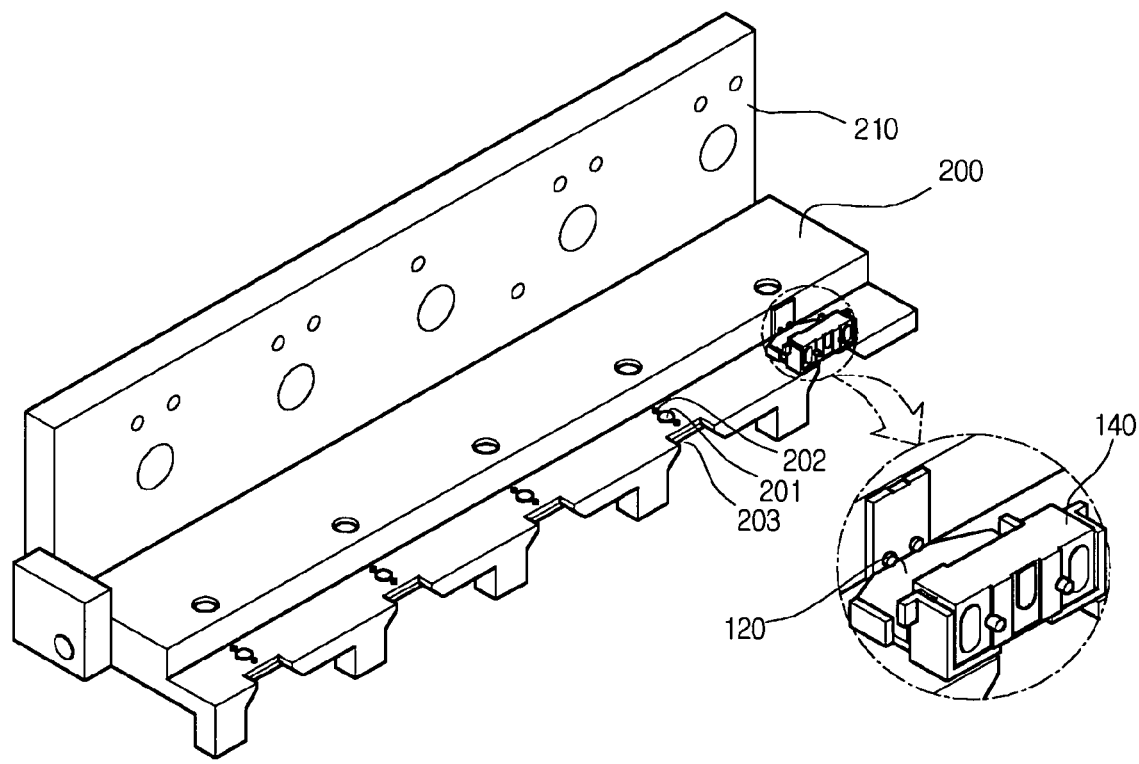
FIGS. 14A and 14B are perspective views illustrating a mounting process of an assembly of a yoke plate and a frame according to an embodiment of the present invention.
Figure 14B:
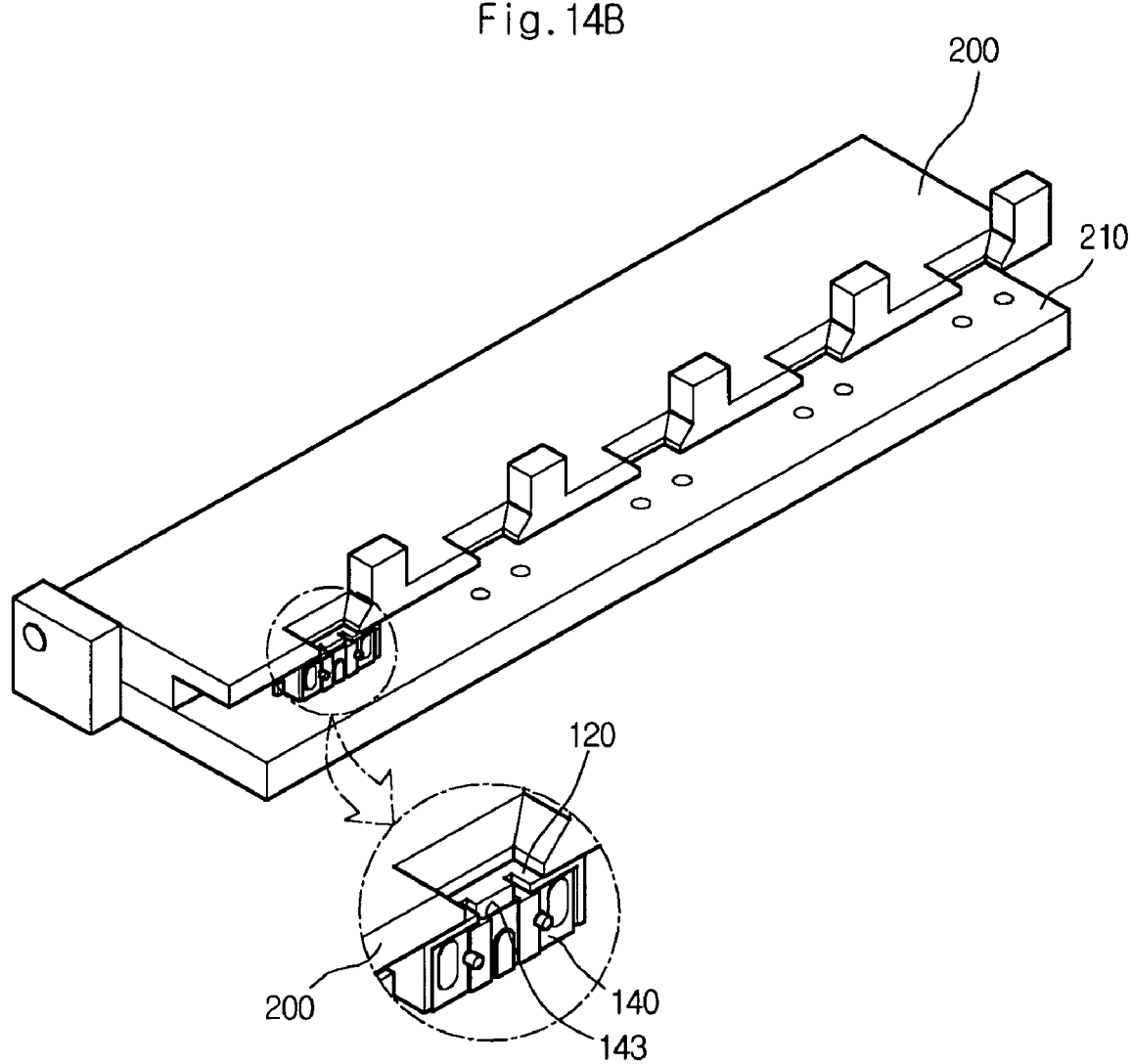

FIGS. 14A and 14B show a coupling process of an assembly of the yoke plate 120 and the frame 140 according to an embodiment of the present invention. As shown in FIGS. 14A and 14B, when the assembly of the yoke plate 120 and the frame 140 is seated on a groove 203 of an assembling jig 200, bosses 201 and 202 of the assembling jig 200 are inserted in the jig guide holes 127 and 128 of the yoke plate 120.

At this point, an upper plate 210 covers the assembly of the yoke plate 120 and the frame 140 such that the assembly can be fixed between the assembling jig 200 and the upper plate 210.

The epoxy resin is filled and hardened in the guide groove 143 of the frame 140 such that the hook 125a of the guide projection 125 of the yoke plate 120 can be fixed by the hardened epoxy resin, thereby preventing the frame 140 from being separated from the yoke plate 120 in the direction of the Z-axis.

Figure 15:
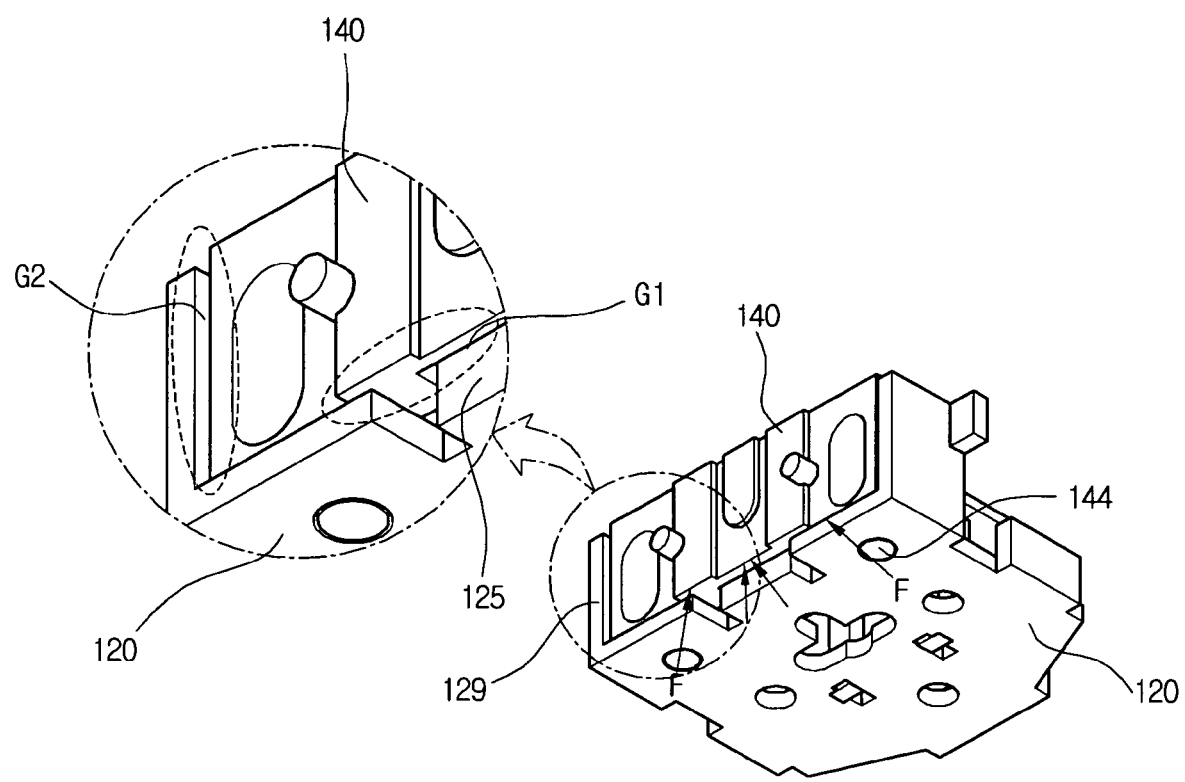
FIG. 15 is a perspective view of an assembly of the yoke plate and the frame depicted in FIG. 9A, illustrating a vibration energy transmission property.

FIG. 15 shows a gap G1 between the top of the yoke plate 120 and the bottom of the frame 140 and a gap G2 between the left and right walls 129 of the yoke plate 120 and the left and right ends of the frame 140. Accordingly, the transmission of the vibration energy from the yoke plate 120 to the frame 140 can be attenuated or reduced by the gaps G1 and G2. That is, the vibration energy may be transmitted only through the bottom of the yoke plate 120 and the epoxy resin forming portion. As a result, the present structure of the pick-up actuator overcomes effectively the vibration problems of the related art.

As shown in FIGS. 9A, 11 and 12A, the fixation of the yoke structure 150 on the yoke plate 120 is realized by attaching the unipolar magnets 124 on the inner yokes 151 of the yoke structure 150, inserting the yoke insertion projections 153 of the yoke structure 150 into the yoke guide grooves 122 of the yoke plate 120, and inserting the seating projection 154 of the second yoke 150 in the seating groove 121a. At this point, according to one embodiment, UV adhesive or other suitable damping/adhesive material may be deposited on the grooves 155 where the first yoke 121 and the yoke structure 150 are temporally coupled to each other to attenuate the vibration at the coupled portion of the first yoke 121 and the yoke structure 150.

Also, as shown in FIG. 12B, when the projections 153 of the inner yokes 151 of the second yoke 150 are fitted in the guide grooves 122 of the yoke plate 120, the UV adhesive or other suitable adhesive/material (shown by the black color) is deposited in a vacancy space 122a of the guide grooves 122 to fix the yoke plate 120, thereby attenuating the vibration transmission to the yoke plate 120.

The length of each yoke guide groove 122 is almost identical to that of the projection 153 and the width of each yoke guide groove 122 is extended outward to provide a space for deposing the UV adhesive or the like.

Figure 16A:
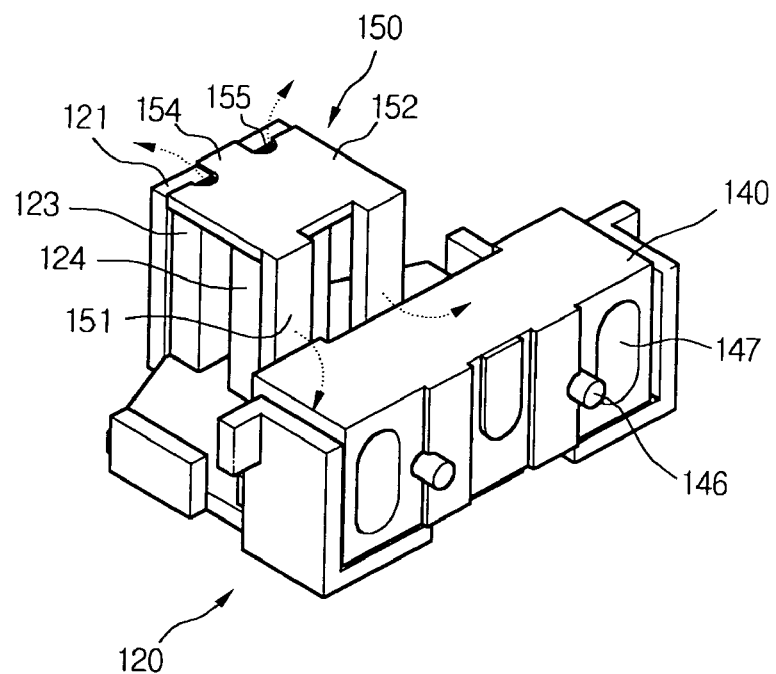
FIGS. 16A and 16B are respectively front and bottom perspective views illustrating the vibration attenuating structure of the yoke plate of the present invention.
Figure 16B:
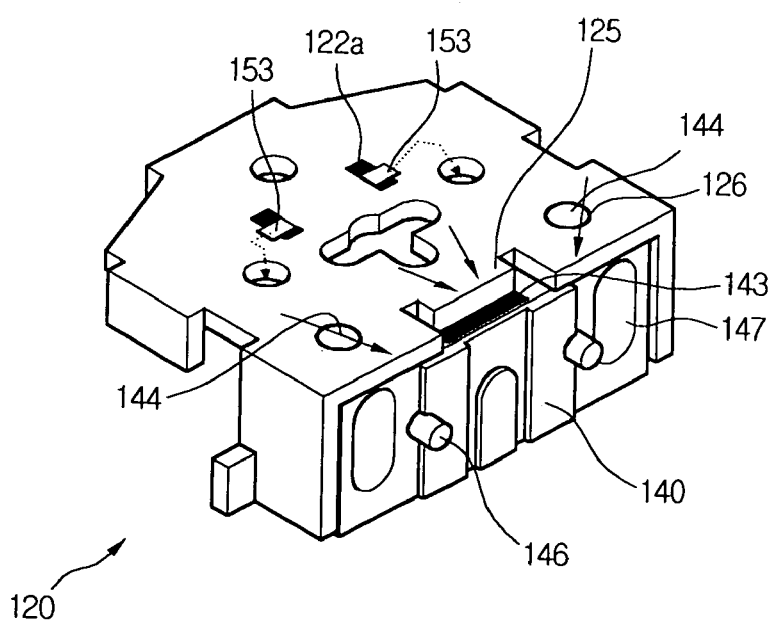

FIGS. 16A and 16B show a vibration attenuating mechanism of the yoke plate 120 according to the present invention. As shown in FIGS. 16A and 16B, since the yoke structure 150 is separate from the yoke plate 120 and the UV adhesive is deposited in a space defined between each projection 153 and the corresponding groove 122, the supporting structure can be enhanced and the vibration transmitted from the inner yokes 151 of the yoke structure 150 can be attenuated effectively.

In addition, since the top yoke 152 of the yoke structure 150 is separate from the first yoke 121 and the UV adhesive is deposed in the grooves 155 (block color in FIG. 16A), the amount of vibration generated from the first yoke 121 would be less than the amount of vibration generated from the yoke without the UV adhesive deposited in the grooves 155.

Figure 1:
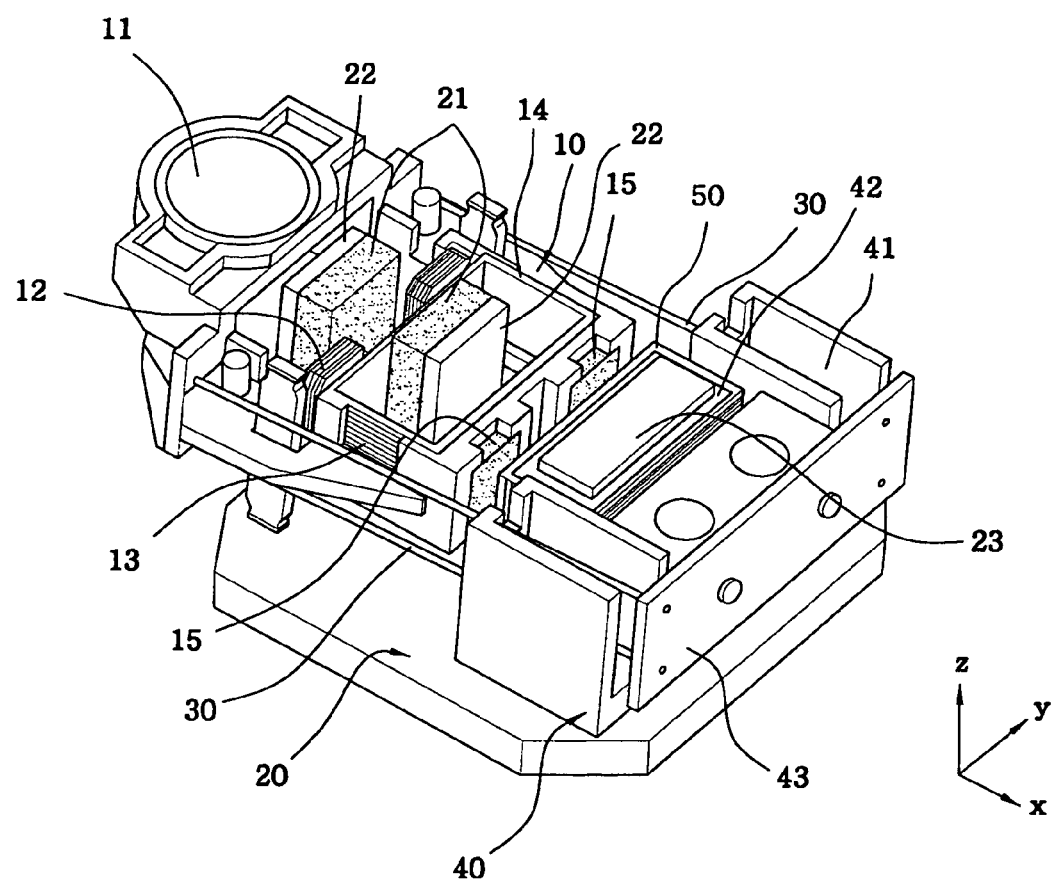
FIG. 1 is a perspective view of a 3-axis motion type optical pick-up actuator according to a related art.
Figure 2:
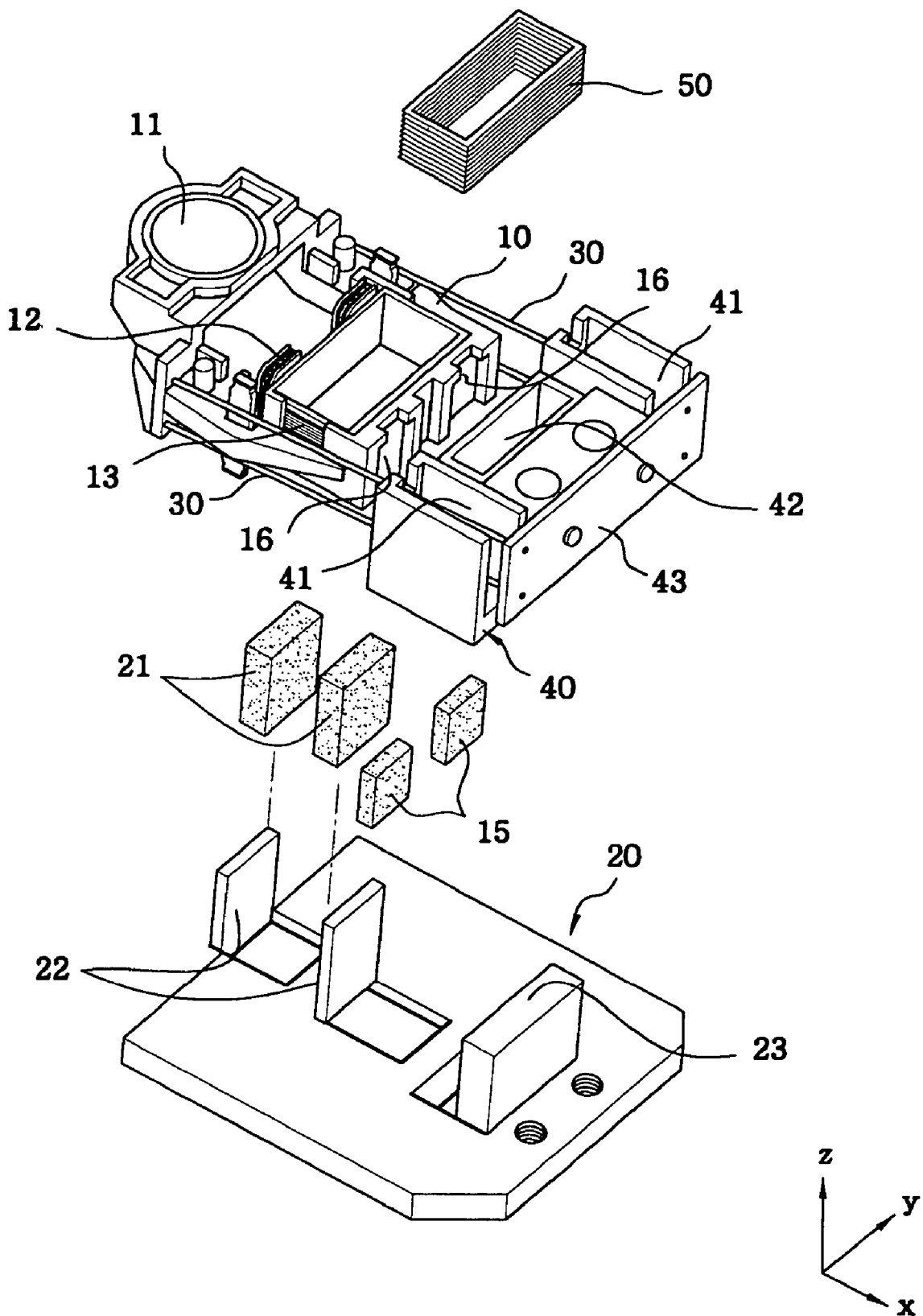
FIG. 2 is an exploded perspective view of the 3-axis motion type optical pick-up actuator of FIG. 1.
Figure 3:
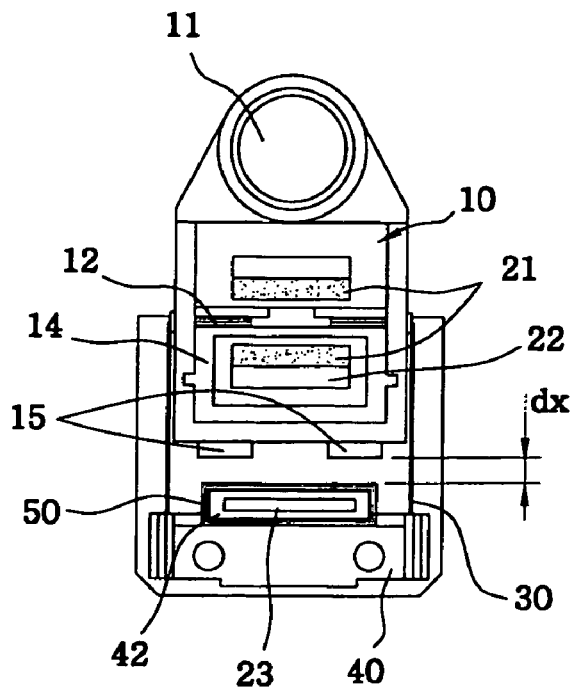
FIG. 3 is a plane view illustrating an affection of the tracking motion on a tilt motion in the 3-axis motion type optical pick-up actuator of FIG. 1.
Figure 4:
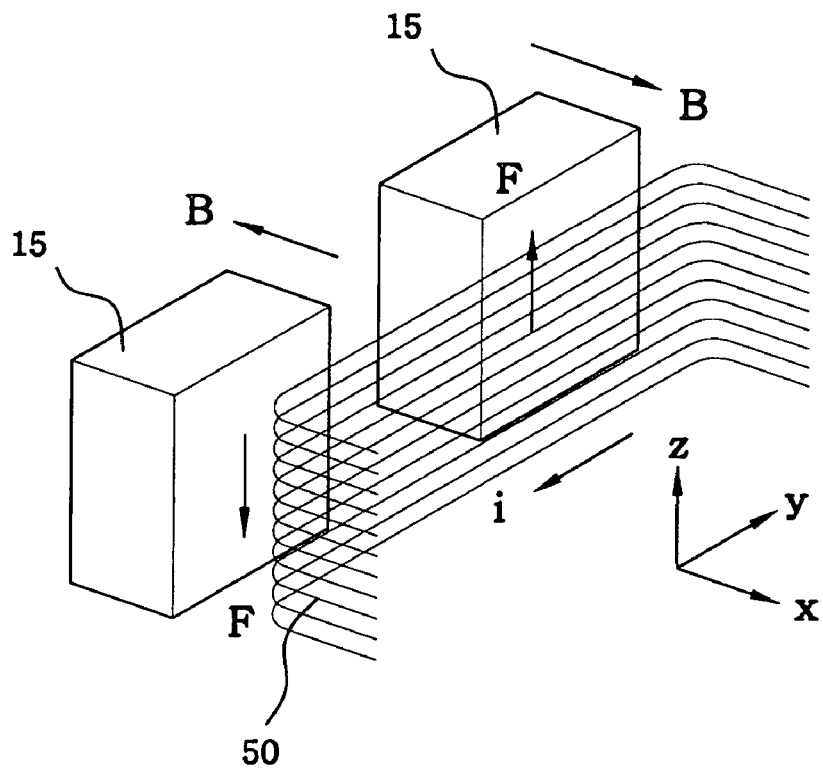
FIG. 4 is a perspective view illustrating a tilt motion performed by tilt magnets and a tilt coil of the optical pick-up actuator of FIG. 1.
Figure 5A:
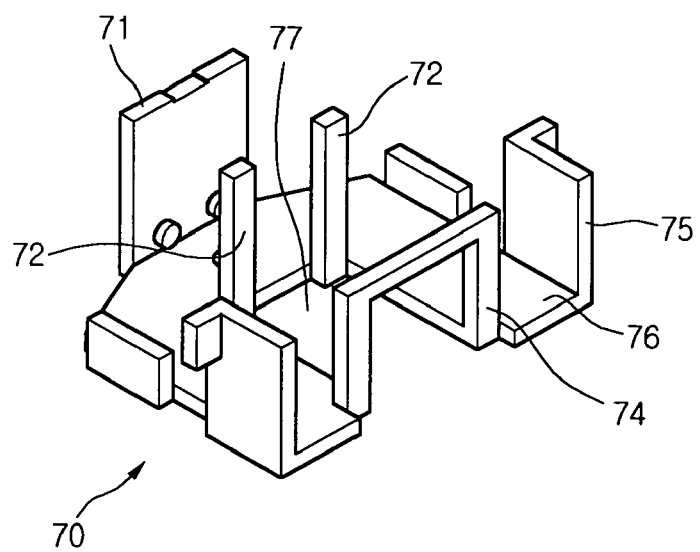
FIGS. 5A and 5B are respectively top and bottom perspective views of a yoke plate for an optical pick-up actuator according to a related art.
Figure 5B:
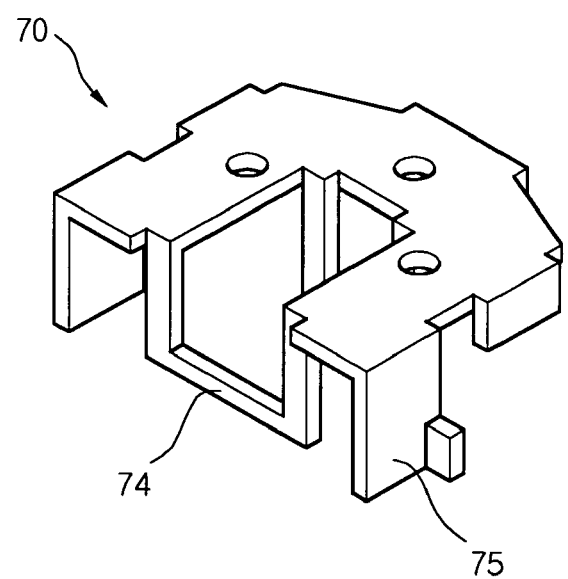
Figure 6A:
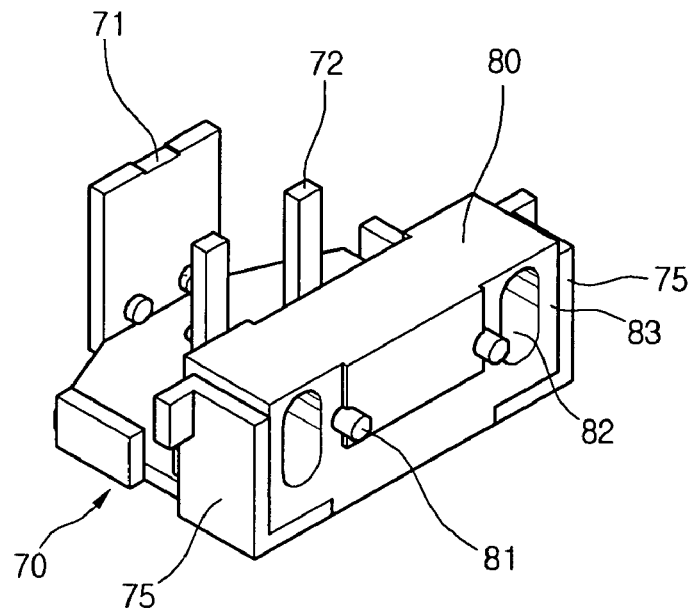
FIGS. 6A and 6B are views showing a frame fixed on the yoke plate of FIGS. 5A and 5B.
Figure 6B:
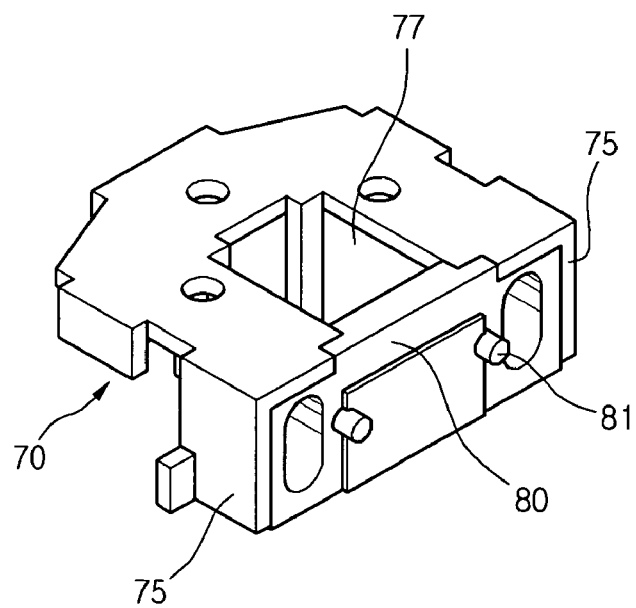
Figure 7A:
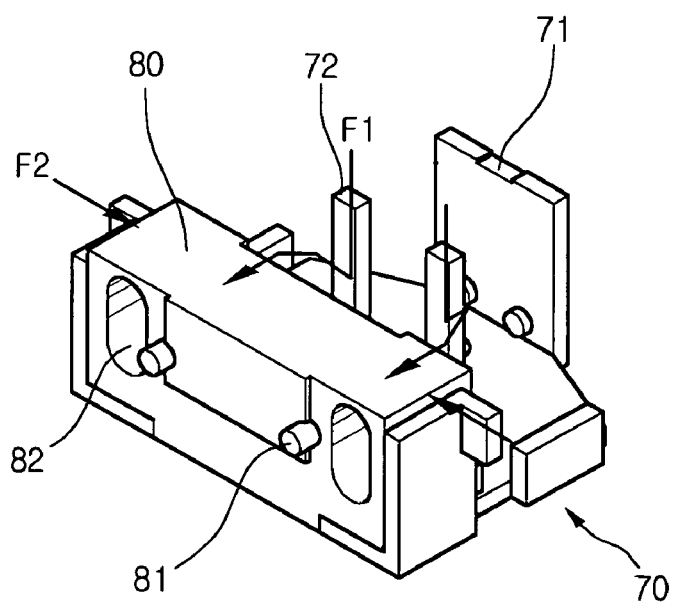
FIGS. 7A and 7B are views illustrating characteristics of vibration energy transmitted from inner yokes to the yoke plate and the frame of FIGS. 6A and 6B.
Figure 7B:
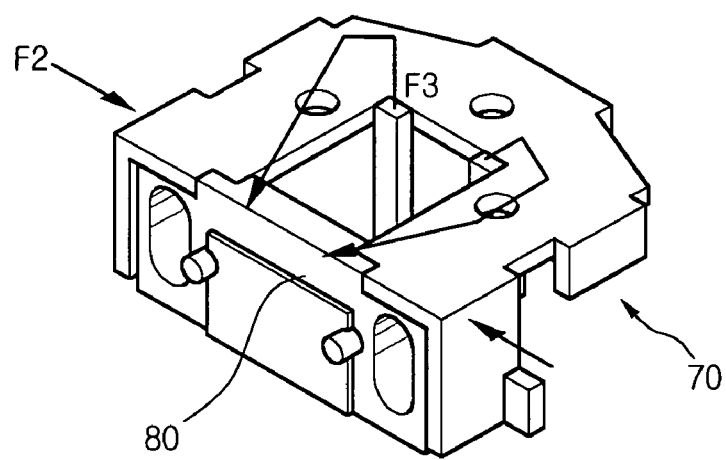

In the related art depicted in FIGS. 7A and 7B, since the inner yokes 72 integrally extend from the bottom of the yoke plate 70 as part of the yoke plate 70, the vibration generated from the inner yokes 72 is directly and fully transmitted to the yoke plate 70 and the frame 80. However, in the present invention, as shown in FIGS. 16A and 16B, the vibration energy of the inner yokes 151 is dispersed and absorbed because the yoke structure 150 is separate from the yoke plate 120 and a vibration damping material such as UV adhesive is used, the effect of the vibration on the actuator can be minimized significantly, thereby improving the optical pick-up efficiency greatly. In addition, since the inner yokes 151 are separate from the yoke plate 120, the rigidity of the yoke plate 120 can be improved and the vibration of the yoke plate 120 is not directed transmitted to the inner yokes 151. Also the gaps G1 and G2 in FIG. 15 function to further attenuate or reduce the transmission of vibration within the optical pick-up actuator.

As described above, since only the first yoke 121 is integrally formed with the yoke plate 120 and the yoke structure 150 is separately prepared and coupled to the yoke plate 120 and a coupling area of the yoke plate 120 to the frame 140 is minimized, the vibration transmission to the frame within the pick-up actuator can be minimized effectively. That is, the vibration generated from the yoke structure 150 is attenuated at the coupling area not to be transmitted to the yoke plate 120 and the frame 140, thereby improving the vibration property of the optical pick-up actuator.

Although the inventive yoke vibration attenuating structure is applied to the above described 3-axis motion actuator, it can be also applied to a 2-axis motion actuator, or other suitable actuators. In fact, the inventive structure can be applied to any actuator that is designed to have a receiving groove that is formed inside the lens holder and magnets and coils disposed in the receiving groove. In addition, a bipolar magnet or unipolar magnets can be attached on the first yoke and a bipolar magnet instead of the unipolar magnets can be attached on the inner yoke.

The above-described vibration attenuating structure can be applied to a slim type optical pick-up actuator as well as a desktop optical pick-up actuator. The vibration attenuating structure can be also applied to both moving coil and moving magnet types.

As described above, in the present invention, since the contact area of the yoke plate and the frame is minimized and the vibration energy transmitted from the yoke plate to the frame can be dispersed and absorbed, the optical pick-up efficiency can be maximized.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A yoke assembly usable in an optical pick-up actuator, the yoke assembly comprising:
    a yoke plate having a first yoke and a groove, the first yoke supporting at least one magnet and the groove being formed passing through the yoke plate;
    a yoke structure having a second yoke and a third yoke, the second yoke supporting at least one magnet and being inserted into the groove of the yoke plate;
    a frame disposed on the yoke plate; and
    wherein the frame has a stepped portion and is configured such that, when the frame is installed on top of the yoke plate, a gap corresponding to a height of the stepped portion is defined between the frame and the yoke plate.

2. The yoke assembly according to claim 1, wherein the second yoke extends integrally from the third yoke, and the second and third yokes form approximately a right angle.

3. The yoke assembly according to claim 1, wherein the third yoke includes a protruding portion resting on a top surface of the first yoke.

4. The yoke assembly according to claim 1, further comprising:
    a height adjusting plate formed on an inner surface of the yoke structure to adjust a height of magnets attached to the yoke plate and the yoke structure.

5. The yoke assembly according to claim 1, wherein the second yoke has two yokes and at least one yoke of the two yokes being fixed in the groove of the yoke plate by adhesive.

6. The yoke assembly according to claim 1, further comprising:
    wire suspensions for supporting a motion of the lens holder, the wire suspensions being electrically connected to the coils.

7. The yoke assembly according to claim 1, wherein when the frame having the stepped portion is installed on top of the yoke plate, the gap corresponding to the height of the stepped portion is defined between a bottom of the frame and the top of the yoke plate.

8. The yoke assembly according to claim 1, further comprising:
    yoke insertion projections formed on lower ends of the second yoke and inserted into the grooves of the yoke plate.

9. The yoke assembly according to claim 1, wherein the first yoke is provided at its lower portion with a stopper for adjusting a height of the magnet in a direction of an X-axis or Y-axis.

10. The yoke assembly according to claim 1, further comprising:
    a height adjusting plate attached on a bent portion of a bottom surface of the third yoke and the height control plate is adapted to adjust a bipolar magnet to an identical height to those of unipolar magnets.

11. The yoke assembly according to claim 1, wherein the yoke plate is provided with a frame fixing projection and a guide grooves formed at at least one side of the frame fixing projection, and the stepped portion of the frame is provided with a fixing guide groove for receiving the frame fixing projection.

12. An optical pick-up actuator comprising:
- a lens holder provided with an object lens mounted at a predetermined portion thereof;
- coils received in a receiving groove formed on the lens holder;
- a first magnet disposed opposing the coils;
- a yoke plate provided with a first yoke, a frame fixing projection and frame guide grooves, the first yoke supporting the first magnet;
- a frame provided at its bottom with a guide groove corresponding to the frame fixing projection of the yoke plate and with guide projections corresponding to the frame guide grooves of the yoke plate; and
- a distance between the left and right walls of the yoke plate is greater than a distance between the left and right ends of the frame, and there are gaps between the left and right walls of the yoke plate and the left and right ends of the frame.

13. The optical pick-up actuator according to claim 12, wherein the frame, fixing projection is fixed to the guide groove of the frame with epoxy resin.

14. The optical pick-up actuator according to claim 12, wherein the frame is provided with undercuts around the frame guide projections.

15. The optical pick-up actuator according to claim 12, wherein the first yoke for mounting the first magnet is integrally formed with the yoke plate at a right angle.

16. The optical pick-up actuator according to claim 12, further comprising:
- a second yoke coupled to the yoke plate, the second yoke having inner yokes on which second magnets are attached and a top yoke bent from the inner yokes at a right angle and seated on the first yoke.

17. The optical pick-up actuator according to claim 12, further comprising:
- wire suspensions for supporting a motion of the lens holder, the wire suspensions being electrically connected to the coils.

18. An optical pick-up actuator comprising:
- a lens holder provided with an object lens mounted at a predetermined portion thereof;
- coils received in a receiving groove formed in the lens holder;
- a first magnet disposed opposing the coils;
- a yoke plate provided with a frame fixing projection and a first yoke for supporting the first magnet; and
- a stepped portion confrnured between guide projections such that when a frame is installed on top of the yoke plate, a gap corresponding to a height of the stepped portion is defined between the frame and the yoke plate.

19. The optical pick-up actuator according to claim 18, further comprising:
- wire suspensions for supporting a motion of the lens holder, the wire suspensions being electrically connected to the coils.

20. The yoke assembly according to claim 18, further comprising yoke plate guide holes inserted around the guide projections.

21. The yoke assembly according to claim 18, further comprising:
- undercuts provided on the frame for preventing generation of burr when the guide holes of the yoke plate are insertod around the guide projections.

* * * * *